(12) United States Patent
Jain et al.

(10) Patent No.: US 6,253,140 B1
(45) Date of Patent: Jun. 26, 2001

(54) ENGAGEMENT CONTROL LOGIC FOR AN AUTOMATIC TRANSMISSION CLUTCH WITH ADAPTIVE ENGAGEMENT FEEL (75) Inventors: Pramod Kumar Jain; Howard Cecil Kuhn, both of Farmington Hills; Ronald James Vodicka, W. Bloomfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/366,416

(22) Filed: Aug. 4, 1999

(51) Int. Cl.[7] ....................................................... G06F 7/00
(52) U.S. Cl. ............................. 701/67; 701/68; 192/3.3; 192/3.31; 477/70; 477/83; 477/171
(58) Field of Search ............................... 701/51, 53, 54, 701/58, 60, 66, 67, 68; 477/115, 120, 143, 154, 156, 176, 169, 174, 70, 77, 78, 79, 83, 86, 166, 171, 173; 192/3.3, 3.31, 3.58, 103 C; 475/123, 128, 63, 65

(56) References Cited

U.S. PATENT DOCUMENTS

| | | | |
|---|---|---|---|
| 3,956,947 | 5/1976 | Leising et al. | 477/120 |
| 4,527,678 | 7/1985 | Pierce et al. | 192/3.58 |
| 4,541,308 | 9/1985 | Person et al. | 477/162 |
| 4,577,737 * | 3/1986 | Nikura et al. | 477/168 |
| 4,875,391 | 10/1989 | Leising et al. | 477/155 |
| 4,938,097 | 7/1990 | Pierce et al. | 475/72 |
| 5,020,391 * | 6/1991 | Aoki et al. | 477/143 |
| 5,029,087 | 7/1991 | Cowan et al. | 701/68 |
| 5,046,174 | 9/1991 | Lentz et al. | 701/60 |
| 5,072,390 | 12/1991 | Lentz et al. | 701/60 |
| 5,101,350 * | 3/1992 | Tokoro | 701/57 |
| 5,150,297 | 9/1992 | Daubenmier et al. | 701/66 |
| 5,157,608 | 10/1992 | Sankpal et al. | 701/58 |
| 5,179,875 | 1/1993 | Brown | 477/154 |
| 5,400,678 | 3/1995 | Jain et al. | 477/115 |
| 5,514,047 | 5/1996 | Tribbles et al. | 477/46 |
| 5,611,750 * | 3/1997 | Kono et al. | 477/65 |
| 5,857,443 * | 1/1999 | Kono et al. | 701/68 |
| 6,073,071 * | 6/2000 | Yasue et al. | 701/51 |

* cited by examiner

Primary Examiner—Jacques H. Louis-Jacques
(74) Attorney, Agent, or Firm—Frank G. McKenzie (57) ABSTRACT

An adaptive control system and method for direct clutch engagement control for an automatic transmission including a micro-controller that receives and stores input data from driveline sensors and executes transmission clutch control logic. The micro-controller develops output signals in real time and transfers the signals to a driver circuit that controls solenoids that enable clutch engagement. The signals for establishing clutch pressure buildup are delivered to a driver circuit that produces hydraulic pressure at the clutch to achieve a smooth torque and speed transition for the torque input elements of the transmission. Adaptive pressure values are stored in a keep-alive memory. The pressure values are adjusted values based on the result of previous engagements. This compensates for driveline variables such as changes in coefficients of friction, spring loads, clutch wear, etc., whereby engagement cycle time is reduced and actual pressure buildup rate is maintained close to desired value to achieve a desired slip change rate, thereby achieving consistent, improved engagement quality.

10 Claims, 5 Drawing Sheets

Fig. 1

| GEAR | RC | CC | FC | DC | L/R | 2/4 | OWC2 DR | OWC2 CO | OWC2 DR | OWC2 CO | RATIO | COAST BRAKING |
|---|---|---|---|---|---|---|---|---|---|---|---|---|
| M-1 |   | X | X |   | X |   | X | – | X | X | 2.889 | YES |
| M-2 |   | X | X |   |   | X | X | – | X | OR | 1.571 | YES |
| M-3 |   | X | X | X |   |   | X | – | X | OR | 1.000 | YES |
| 1st |   |   | X |   |   |   | X | OR | X | OR | 2.889 | NO |
| 2nd |   |   | X |   |   | X | X | OR | X | OR | 1.571 | NO |
| 3rd |   |   | X | X |   |   | X | OR | X | OR | 1.000 | NO |
| 4th |   |   | X |   |   | X | OR | OR | X | OR | .689 | YESS |
| REV | X |   |   |   | X |   | – | – | – | – | 2.310 | YES |

ENGAGEMENT CONTROL LOGIC FOR AN AUTOMATIC TRANSMISSION CLUTCH WITH ADAPTIVE ENGAGEMENT FEEL

BACKGROUND OF THE INVENTION

Automatic transmissions used in automotive vehicles may include a hydraulic pressure control system for controlling the application of friction clutches and brakes to accomplish gear ratio changes and to effect startup from a standing start in either forward drive or reverse drive. A clutch is used during vehicle startup to establish a torque flow path between an engine-driven turbine of a hydrokinetic torque converter and the torque input gear element of the transmission. The clutch, however, does not include a mechanism for compensating for normal wear of the clutch nor for changes in driveline variables such as temperature changes and engine calibration tolerances. The transmission, furthermore, is not typically calibrated to satisfy the requirements of different drivers with varying driver habits. A smooth clutch engagement for one driver might not occur with a second driver with different driving habits.

Variations, over time, in quality of the clutch engagement may occur also due to normal wear of the valve elements and changes in the characteristics of springs that are used to control valve movements.

Examples of known automatic transmissions that employ startup clutches for multiple-ratio gearing may be seen by referring to U.S. Pat. Nos. 4,527,678, 5,150,297 and 5,157,608, which are assigned to the assignee of this invention. The disclosures of these patents are incorporated in the present disclosure by reference.

BRIEF DESCRIPTION OF THE INVENTION

The invention comprises an adaptive control system for providing consistent, smooth engagement of a forward or reverse clutch in a multiple-ratio transmission during vehicle startup. It includes a closed-loop and adaptive strategy that provides for fast engagement of the clutch while maintaining consistent engagement quality. The closed-loop and adaptive strategy takes into account changes in the system dynamics of the transmission throughout the life of the transmission and also eliminates variations in the dynamic characteristics when the same transmission is used with any of a variety of engines in an automotive vehicle driveline.

Engagement quality is maintained at a consistent level by adapting the initial clutch pressure commanded at the beginning of the torque phase of the engagement cycle. This is based on a linearly extrapolated slip change time and the time from the start of engagement to the start of the slip change mode.

Adaptive pressure values are stored in a microprocessor keep-alive memory (KAM) for each engagement. The engagement parameters are adjusted based on the results of previous engagements. In this way, system variations caused, for example, by changes in coefficient of friction, spring loads, clutch wear, etc., are accommodated. Engagement strategy will provide for a reduced stroke and a reduced torque transfer time while maintaining actual slip rate changes to values approximately equal to the desired slip rate change.

During an engagement, two control elements are required (i.e., the control elements could be a friction clutch and a friction brake or a friction clutch and an overrunning brake). One control element, which may be a clutch or a brake, is applied in advance of the engagement cycle. The other control element, which is the oncoming friction element, responds to pressure controlled in a closed-loop fashion to achieve a controlled slip rate. A torque feed-forward technique is used to improve the response to changes in transmission input torque. When the engagement of the clutch is near completion, a shaping function is used to reduce the desired slip rate to effect a smooth termination of the slip change mode.

The system includes a digital microprocessor that receives and stores input signals from sensors and executes the transmission control logic output of the microprocessor during successive control loops. The logic uses sensor input developed in real time for conditioning control valve solenoid actuators that enable engagement of the friction elements. Sensors monitor the engine torque, the turbine speed, the output shaft speed, the throttle position and the transmission range selection, among other variables. The solenoid signals, during each control loop, calculated by the microprocessor for the oncoming clutch, are based upon the clutch control logic and the parameters calculated during preceding control loops.

PARTICULAR DESCRIPTION OF THE INVENTION

Figure 1:
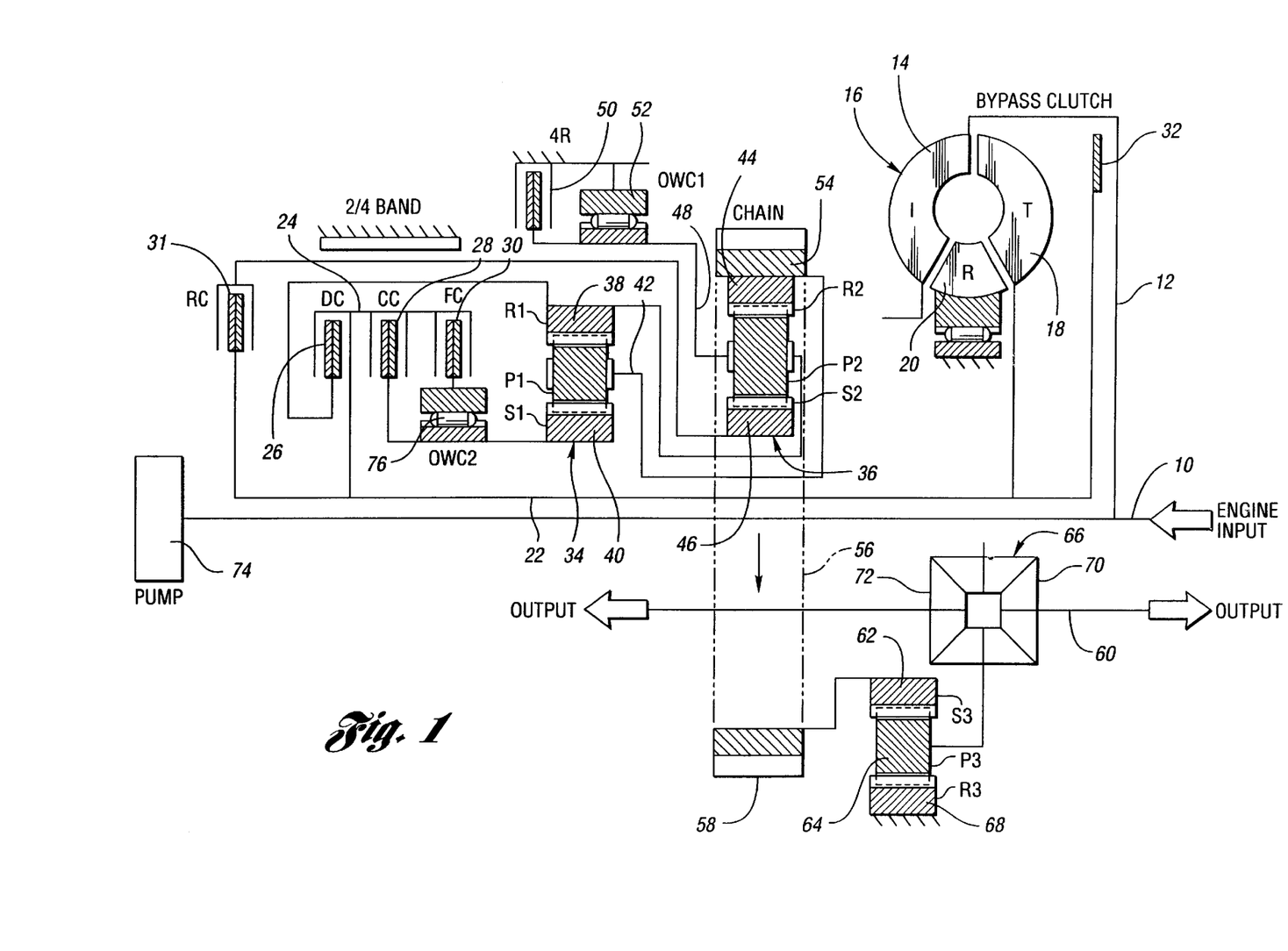
FIG. 1 is a schematic diagram of an automatic transmission that includes friction clutches that may be controlled using the engagement control logic of the invention.

FIG. 1 shows in schematic form a multiple-ratio automatic transmission for an automotive vehicle. It is capable of embodying the engagement control system of the present invention.

Numeral 10 in FIG. 1 is a torque input shaft for the transmission, which is drivably connected to the crankshaft of an internal combustion engine (not shown). Although a specific embodiment of the gear system has been disclosed in FIG. 1, the invention may be used also in a variety of other planetary gear systems, such as the gear system disclosed in U.S. Pat. Nos. 5,157,608, 4,541,308 and 5,150,297. Each of them discloses a gear system and a clutch and brake control valve system for controlling planetary gear elements to establish multiple forward-driving ratios and a single reverse ratio. The disclosures of these prior art patents are incorporated herein by reference.

Torque input shaft 10 is connected drivably to a damper and drive plate assembly, schematically shown at 12, to impeller 14 of a hydrokinetic torque converter 16. Torque converter 16 comprises a turbine 18 and a bladed stator 20 situated between the torus flow output section of the turbine 18 and the torus flow inlet section of the impeller 14. The turbine 18 is connected to turbine shaft 22, which extends to the torque input member 24 for direct-drive clutch 26, coast clutch 28 and forward clutch 30. It is connected also to reverse drive clutch 31.

A bypass clutch of conventional design is shown at 32 for mechanically connecting the impeller 14 and the turbine 18 to eliminate torque converter slip. A typical torque converter control valve circuit for controlling the engagement of the bypass clutch 32 may be seen by referring to U.S. Pat. No. 5,029,087, which is also assigned to the assignee of the present invention.

The transmission of FIG. 1 comprises a pair of simple planetary gear units 34 and 36. Gear unit 34 includes a ring gear 38, a sun gear 40 and planetary pinions journalled on carrier 42. The pinions on carrier 42 engage drivably sun gear 40 and ring gear 38. Carrier 42 is connected drivably to ring gear 44 of planetary gear unit 36. Sun gear 36 of gear unit 36 is connected drivably to the reverse drive clutch 31, which delivers reverse drive torque to sun gear 46 during reverse drive.

Ring gear 38 journals pinions which engage drivably the ring gear 44 and the sun gear 46. It is anchored by low-and-reverse brake 50 during operation in low ratio and in reverse. Forward operation reaction braking can be obtained by overrunning coupling 52, which provides a parallel torque flow path for reaction torque during forward drive operation.

The ring gear 44 is directly connected to a chain drive sprocket 54, which meshes with drive chain 56 connected to driven sprocket 58 mounted on the output shaft axis 60. Final drive sun gear 62 engages final drive pinion assembly 64, which is connected to the carrier for differential gear assembly 66. Pinions 64 engage stationary ring gear 68.

The differential assembly includes side gears 70 and 72, which are respectively connected to separate axle half shafts (not shown) located on common output shaft axis 60.

The turbine shaft 10 is connected drivably to positive-displacement pump 74, which serves as a pressure source for a control valve system for controlling the clutches and brakes for the transmission gearing. The clutches and brakes are fluid-pressure actuated in a manner described in the prior art patents previously discussed.

When the transmission is conditioned for forward-drive operation from a standing start, the forward clutch 30 is engaged by supplying control pressure to stroke a clutch piston from a released position to a clutch-engaging position. The rate of clutch pressure buildup during stroking of the piston determines the quality of the engagement cycle. The same is true if startup in reverse occurs from a standing start, in which case the clutch 31 would be controlled in a similar fashion.

Figure 2:
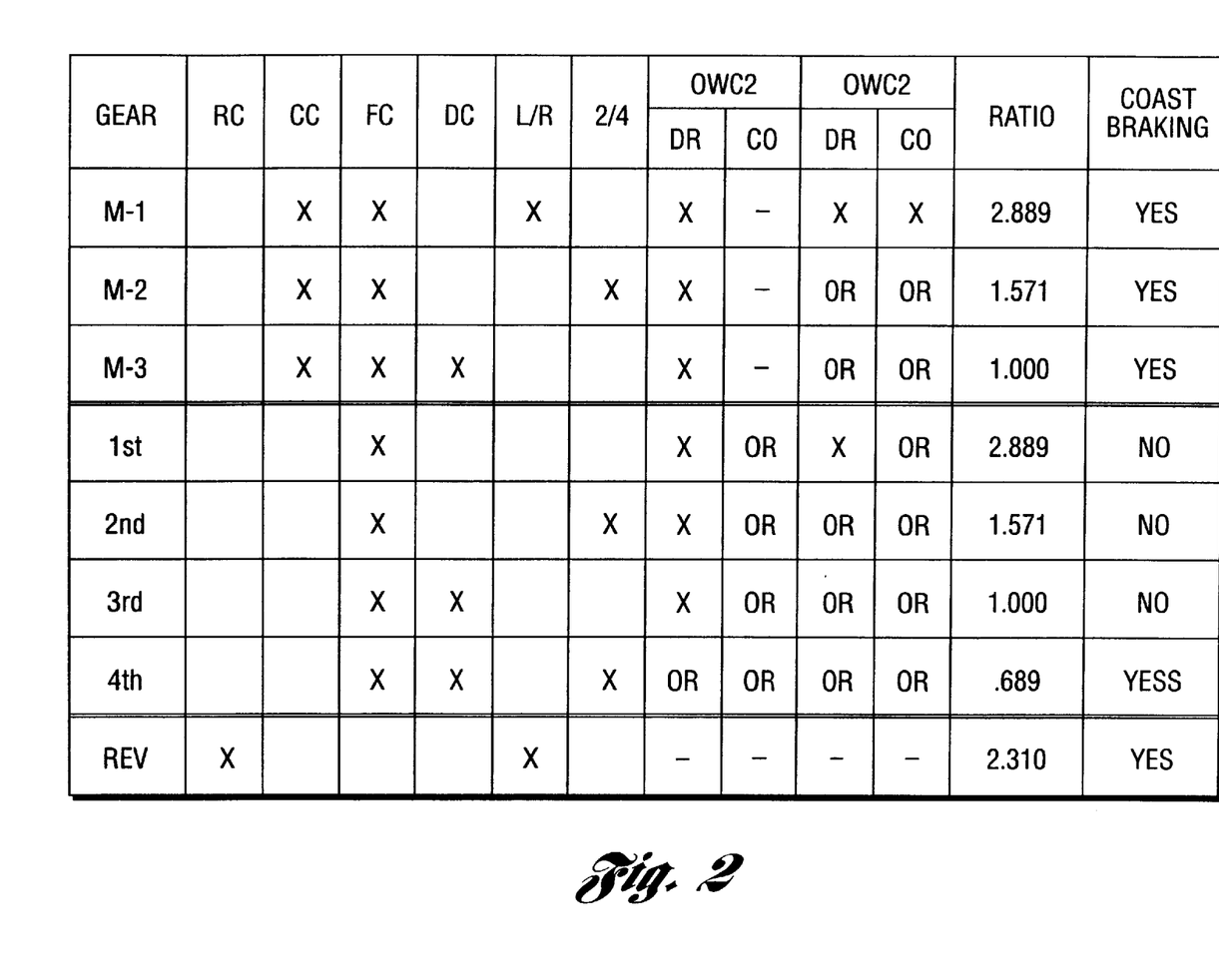
FIG. 2 is a chart that shows the friction element engagement and release pattern for the transmission illustrated schematically in FIG. 1.

The chart of FIG. 2 shows the clutch and brake engagement-and-release pattern for each of the four forward-driving ratios and the single reverse ratio for the transmission illustrated in FIG. 1. In the case of a startup in forward drive range, turbine torque is delivered through the clutch 30 and through overrunning coupling 76 to the sun gear 16. If coast braking in first gear is desired, the coast clutch 28 is engaged to bypass the overrunning coupling 76. The same is true for the low-and-reverse brake 50. That is, reaction torque can be distributed through the overrunning coupling 52 for purposes of establishing a reaction torque flow path during low-speed ratio operation in the forward drive range. If coast braking in the low ratio is desired, the brake 50 is applied, thereby bypassing the overrunning coupling 52.

The gear ratios in which coast braking is desired are identified in FIG. 2 by the symbols M1, M2 and M3. Reverse clutch 31 is identified in FIG. 2 by the symbol RC. Coast clutch 28 is identified by the symbol CC. Forward clutch 30 is identified by the symbol FC. Direct clutch 26 is identified by the symbol DC. Low-and-reverse brake 50 is identified by the symbol L/R.

It will be observed from FIG. 2 that two control elements must be applied to establish either forward drive engagement or reverse drive engagement. The present invention can be applied to a gearing system of the kind illustrated in FIG. 1 by controlling the oncoming control element while the other control element is previously applied. This is true for both a forward drive engagement and a reverse drive engagement. For purposes of this disclosure of one embodiment of the invention, however, the oncoming control element for forward-drive engagement will be considered to be the friction clutch 30 and the oncoming control element for reverse drive engagement will be the friction clutch 31.

Figure 3:
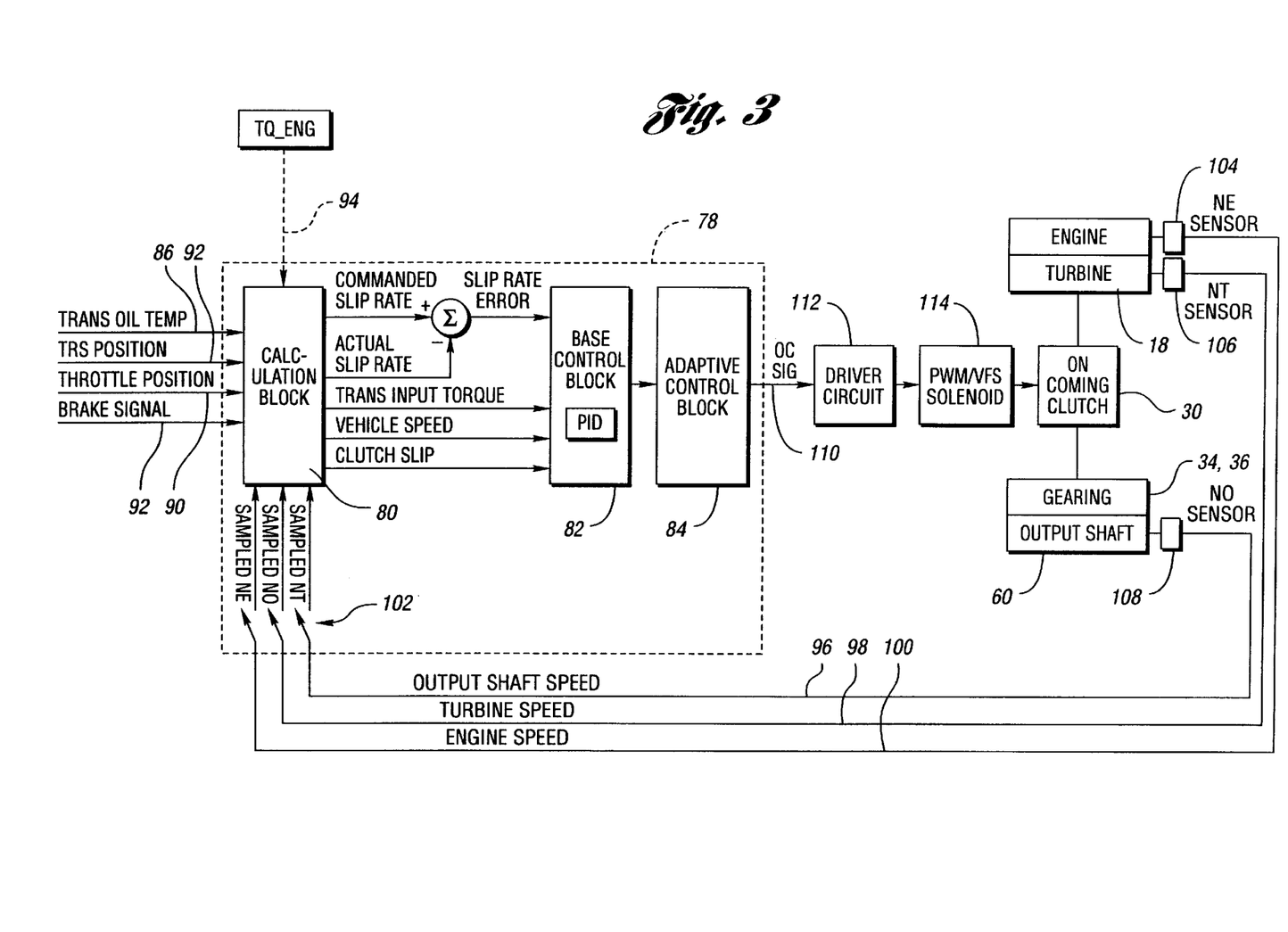
FIG. 3 is an engagement control system block diagram for carrying out the clutch engagement logic of the invention.

FIG. 3 is a schematic representation in block diagram form of the engagement control system of the invention. It includes an engagement control electronic microprocessor 78, which includes a calculation block 80. Block 80 receives control signals, to be described subsequently, as well as closed-loop feedback signals, also to be described subsequently. Processor 78 includes also a base control block 82, which receives the output signals of the calculation block 80, and an adaptive control block 84, which adjusts the output of the control block 82 to account for variations in driveline parameters, stored in KAM, that occur following the initial driveline calibration. The initial calibration constants are stored in ROM. These variations, for example, may be friction element wear or variations in the function of the control valve elements due to lubricant contamination or extreme changes in temperature, or changes in driver habits, or changes in spring loads on the valves, or changes in the coefficients of friction of the materials used in the friction elements.

The microprocessor 78 receives and stores input signals from sensors such as transmission oil temperature signal 86, transmission range selector position signal 88, engine throttle position signal 90, and a brake signal 92 that indicates whether the vehicle brakes are applied.

An engine torque signal (TQ_ENG) is received by the microprocessor 78, as indicated by the signal flow path 94. An engine speed signal flow path 96, a turbine speed signal flow path 98 and an output shaft speed signal flow path 100 communicate with the calculation block 80 through sampling switches 102. The signals in the signal flow paths 96, 98 and 100 are established by engine speed sensor 104, turbine speed sensor 106, and output shaft speed sensor 108. The outputs are delivered in a closed-loop fashion to the calculation block 80.

The adaptive control block 84 establishes an oncoming clutch control signal at 110 for a control valve system with modulated solenoid valves. In the case of a PWM solenoid control, the signal at 110 would be a duty cycle signal for the driver circuit 112, which supplies input signals to the control valve solenoids 114.

The solenoids may be either pulse-width modulated solenoids or variable-force solenoids. The output of the solenoids 114 control the oncoming clutch, which may be the clutch 30 previously described. Pressure to the oncoming clutch is controlled to provide a smooth torque and speed transition to the driver-selected startup gear ratio.

Figure 4:
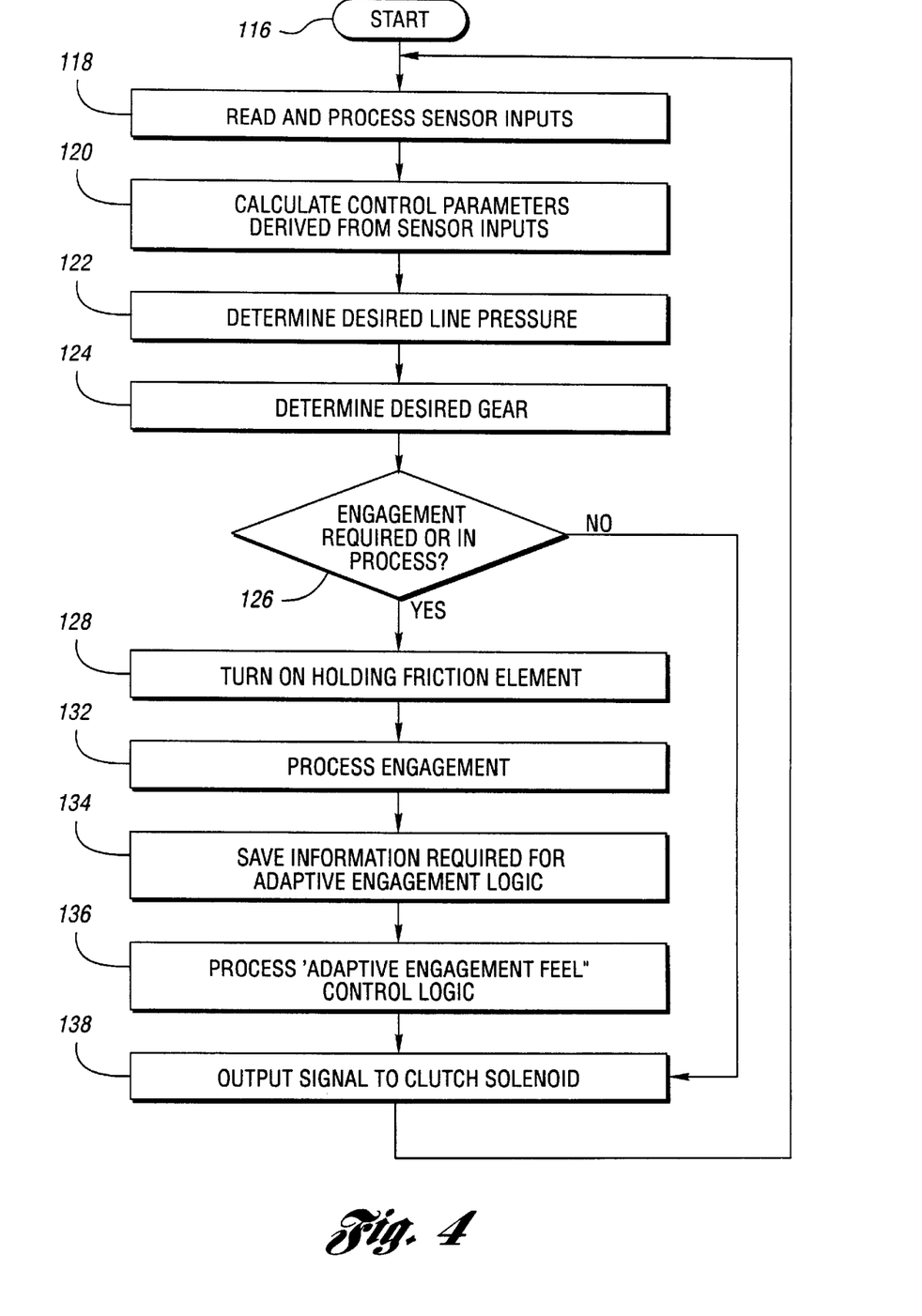
FIG. 4 is a flow diagram showing the clutch engagement control algorithm for the engagement logic of the invention.

FIG. 4 shows a flow diagram that describes the transmission engagement control algorithm. The beginning of the engagement routine is represented by the action block 116. Filtered engine speed, turbine speed, output shaft speed, transmission oil temperature, transmission range selector lever position, throttle position, a brake on/off signal, and an air conditioning on/off signal (if the vehicle has an air conditioning system) are read at action block 118.

The next step in the routine is at action block 120 at which control parameters are calculated. The parameters are derived from the sensor inputs. The vehicle speed is calculated as the output shaft speed times a conversion constant. The speed ratio across the gearset, which is another control parameter, is equal to the turbine speed divided by the output shaft speed. Transmission input torque is calculated from the engine parameters in known fashion, and clutch slip for the oncoming clutch is determined from the turbine speed and the output shaft speed.

The next step in the routine is at action block 122 where the line pressure required is determined as a function of the current gear engagement, the transmission input torque and the vehicle speed.

At action block 124, the desired gear is determined by the microprocessor from throttle position, vehicle speed, range selector position and current gear.

The next step in the routine is at decision block 126 where a determination is made as to whether an engagement is required or an engagement is currently in progress. An engagement is required if the previous gear was neutral or park and the desired gear is not neutral or park. If an engagement is required or is in process, the routine proceeds to action block 128. If it is not required, the routine will proceed directly to action block 130, where the output signal to the oncoming clutch control solenoid is determined. This will be described subsequently.

As previously indicated, two control elements are required to hold the transmission in a driving gear. One control element, in the case of the embodiment described here, is the oncoming friction clutch, and the other control element is the holding element, which is engaged before the oncoming friction clutch begins its engagement routine. In the case of a transmission in which a reaction element is an overrunning coupling, the overrunning coupling acts as a holding element. For example, overrunning coupling 52 would function as a holding element in the case of a startup engagement of clutch 30 in the normal forward-drive range.

The engagement process begins at action block 132. The engagement events and the timing of the engagement occurs in this step. The engagement is divided into five modes. These are identified as the pre-engagement mode, the engagement start mode, the slip change mode, the engagement end mode, and the post-engagement mode. Each of these modes is identified in the plot of FIG. 5c, where oncoming clutch slip is plotted against engagement time.

After the holding friction element is engaged, engagement processing occurs at action block 132. At that time, the base control block 82 of FIG. 3 will determine if the entry conditions for executing the adaptive logic at adaptive control block 84 are satisfied. These conditions include criteria based on throttle position, transmission temperature, vehicle speed, engine speed and strategy-enabling electronic switches. The adaptive logic will be described subsequently.

After the engagement has ended, the information required for the adaptive logic is stored in memory. This information includes the values of the parameters needed to evaluate the engagement. These parameters are designed for use in the adaptive control logic for subsequent engagements and are the basis for adaptative changes to the adaptive parameters that are used during the next engagement. This occurs at action block 134 in FIG. 4.

The adaptive engagement feel control logic using the information that is saved at action block 134 is carried out at action block 136. This also will be described in detail subsequently.

Figure 5A:
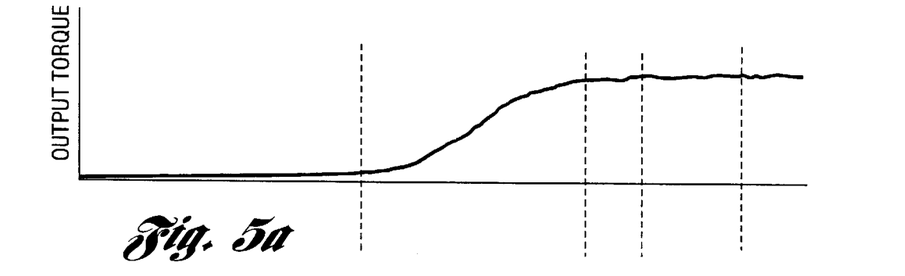
FIG. 5a is a chart showing the relationship between output torque and clutch engagement time for the engagement control logic of the invention.
Figure 5B:
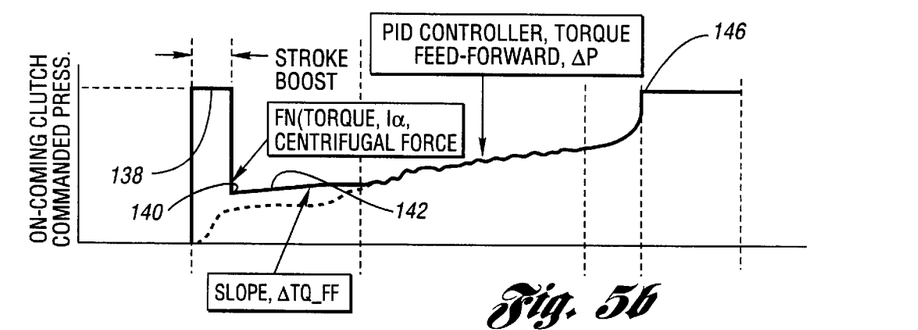
FIG. 5b is a plot of the oncoming clutch commanded pressure versus engagement time for the engagement control logic of the invention.
Figure 5C:
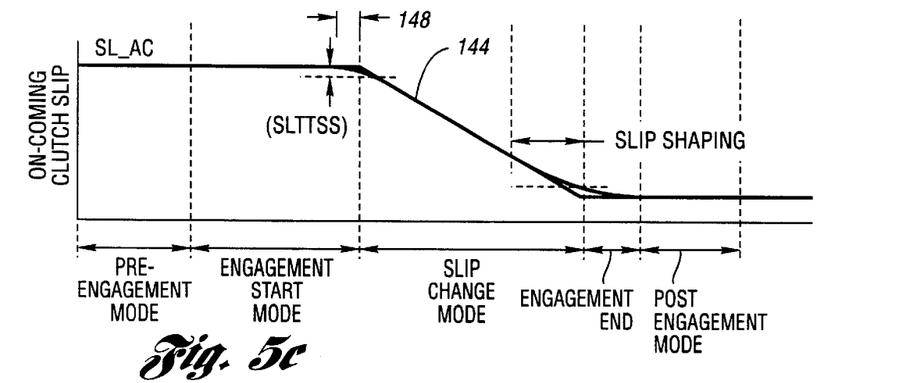
FIG. 5c is a plot of the oncoming clutch slip during the engagement interval for the engagement control logic of the invention.

The pre-engagement mode of the clutch engagement process, illustrated in FIG. 5c, provides a time of fixed duration during which the system allows for a line pressure transient response to an engagement command. It also pre-stages the friction elements by setting to zero the oncoming control element pressure as the other control element involved in the engagement is fully applied.

As the oncoming control element becomes applied during the engagement start mode, as seen in FIG. 5c, three successive stages are executed. The first is the boost phase when the pressure to the oncoming control element is commanded to its maximum value for a short period of time. This is illustrated at 138. This boost allows the control element to be filled quickly and for the clutch piston to be stroked to a position just short of its fully stroked position. The length of time allotted for the boost phase is a function of line pressure. It is compensated for temperature.

The boost phase is followed by the stroke phase at 140, as seen in FIG. 5b. The commanded pressure for the oncoming control element at the beginning of the stroke phase is set to a value close to the stroke pressure (PROCSS) for a calibratable time. The stroke pressure moves the control element piston to a position just short of the point where the friction surfaces are frictionally engaged.

The stroke phase is followed by a torque transfer phase at 142, as shown in FIG. 5c. At the start of the torque transfer phase, engagement pressure is calculated by the microprocessor in accordance with the following equation:

PR_CMDoc=[{TQ_TRANS+TQ_iα,}*MLTQoc/GAINoc+PR-SToc−Cfoc*(NT/1000)$^2$+FNpnPRTTOF(TP)−PRDL_rom+PRDL_kam]*MLTEoc where

| | |
|---|---|
| PR_CMDoc | = Oncoming control element (clutch) commanded pressure |
| TQ _TRANS | = Input torque to transmission (computed as a torque-feed-forward by the engine controller, not shown) |
| Cfoc | = Conversion constant for centrifugal force compensation |
| TQ_iα | = Inertial torque based on inertia, change in turbine speed, and desired ratio change time { = CONST * Inertia * ΔNT/ratio change time} |
| MLTQoc | = Ratio of clutch torque to input torque |
| MLTEoc | = Temperature compensation multiplier |
| GAINoc | = Clutch gain |
| PRSToc | = Oncoming clutch stroke pressure |
| NT | = Turbine speed |
| PRDL_rom | = Delta clutch pressure fron ROM table |
| PRDL_kam | = Delta clutch pressure from KAM table |
| FNpnPRTTOF(TP) | = Increment in commanded pressure for faster response |

The terms PRDL_rom and PRDL_kam are adaptive terms used in the adaptive logic. PRDL_rom is determined during initial transmission calibration and is stored in ROM. PRDL_kam is a learned term stored in KAM during the previous control loop of the microprocessor.

The commanded pressure for the oncoming clutch is increased, as shown at 142, in accordance with the following relationship:

PR_CMDoc={PR_CMDoc_old+PRSLTT+ΔTQ_trans*MLTQoc/GAINoc}*MLTEoc where

| | |
|---|---|
| PRSLTT | = Slope of the pressure increase |
| ΔTQ_trans | = Change in transmission input torque, which is the change from the previous control loop of the microprocessor. |

In the preceding equation, ΔTQ_trans is a change in transmission input torque for the previous control loop of the microprocessor.

At the end of the engagement start mode, the slip indicated in the plot of FIG. 5c decreases by a calibratable value over a given time. At the end of the engagement start mode, the commanded clutch pressure is reduced to the pressure that is needed to hold the input torque.

FIG. 5c shows at 144 a linearly extrapolated slip change line where the controller, during the slip change mode, controls the slip rate to a desired value by controlling the oncoming clutch pressure in a closed-loop fashion. This is done using a proportional-integral-derivative controller (PID controller) contained in the control block 82 of FIG. 3.

In order to improve the response time to changes in transmission input torque, a torque feed-forward routine is used. This establishes a quicker response to input torque changes and improves the accuracy of the control system.

The torque feed-forward term, a constant, is an open-loop correction to a closed-loop control. A closed-loop control produces a response after the fact; that is, a feedback error in the torque would have to be established before a correction could be made at the input end of the control loop. In contrast, by using a torque feed-forward correction, an estimated torque for the clutch is obtained by multiplying the input torque signal by a torque feed-forward constant. For large changes in torque, a feed-forward constant using change in throttle position is used.

At the beginning of the slip change mode, provision is made for desensitizing the closed-loop controller by introducing a desensitizing function that varies from "zero" to "one" when the clutch pressure is computed.

When the engagement of the clutch is near completion, a shaping function is used, as will be explained subsequently, which is a modifier for the desired slip rate. This provides pressure control beginning at the end of the ratio control mode (see label "Slip Shaping" in FIG. 5c). In this way, the clutch is gradually applied.

The steps involved in the slip change mode includes first a determination of the slip rate desired as follows:

Determine slip rate desired {=FNSLRDSRC(NE)}

The slip shaping factor for the end of the ratio change mode, which establishes smoothness at the end of the ratio change mode, is determined as follows:

Shaping factor for shift end ratio smoothness=FNFRRC (SL_ACT), where SL_ACT is clutch slip The slip rate commanded then is determined in accordance with the following equation:

Slip rate commanded

SLR_CMD=Slip_rate_desired*shaping_factor

The control error is computed as follows:

Control error

ERR_TO=commanded slip rate—actual slip rate

The change in pressure at the clutch using a PID controller is determined in accordance with the following equation:

ΔP(PID)=Kc*[Kp*(SLR_ERR_TO_SLR_ERR_T1)+Ki*SLR_ERR_TO+Kd*(SLR_ERR_T-2*SLR_ERR_T1+SLR_ERR_T2)], where SLR_ERR is computed as difference between commanded and actual slip rates. SLR_ERR_TO, SLR_ERR_T1, SLR_ERR_T2 are control errors at current loop, previous loop, and one loop before previous loop, respectively.

For the PID controller: Kc is the overall gain, Kp is the proportional gain, Ki is the integral gain, and Kd is the derivative gain.

A new clutch pressure then is computed as follows:

PR_CMDoc=[PR_CMDoc_old+ΔP(PID)*FNFRRB(ctr_ramp)+FNPRCO(ΔTP)+CCPRTF*(ΔTQ_TRANS)]*FNMLTEoc(tempr.)

where

FNFRRB(ctr_ramp) is multiplier as a function of loop counter from the start of ratio change to reduce the gain of PID controller for the first few loops, for smooth transition. This is a so-called desensitizing function, as previously discussed.

FNPRCO(ΔTP)is feed-forward term to compensate for sudden large changes in throttle position (ahead of torque changes)

CCPRTF is constant for torque feed-forward term to compensate for changes in input torque FNMLTEoc(tempr.) is temperature compensation multiplier The term ΔTQ_TRANS is the torque feed-forward term, previously discussed. ΔTQ_TRANS in the preceding equation is the change in transmission input torque from the previous control loop and CCPRTF is a conversion constant.

The ratio change mode ends when the clutch slip approaches zero. The ratio change mode will be interrupted and terminated if it does not end in a reasonable amount of time. The control then will be passed immediately to the shift-end mode, as seen in FIG. 5c.

The engagement-end mode completes the application of the oncoming clutch. This is done as the commanded pressure to the oncoming clutch is increased parabolically until it reaches the commanded line pressure 146 in FIG. 5b. This is done to increase the oncoming clutch pressure without a torque bump after the clutch is applied but not slipping.

The post-engagement mode, like the pre-engagement mode, is of a fixed duration. It is used to allow time for the oncoming clutch pressure to rise to line pressure as seen at 146 in FIG. 5b.

The output torque that results from the control of the clutch pressure seen in FIG. 5b is plotted in FIG. 5a as a function of engagement time.

After the engagement has been completed, the values of the parameters that are needed to evaluate the engagement are stored in keep-alive memory (KAM). These parameters are designed for subsequent use in the adaptive logic. They are the basis of the adaptive changes that occur to the adaptive parameters when they are used during the next clutch engagement. The adaptive engagement feel logic at action block 136 in FIG. 4 will be described subsequently. The entry conditions for executing the adaptive logic must be met before the logic is executed. These conditions are based on throttle position, transmission temperature, vehicle speed, engine speed and the states of strategy-enabling electronic switches.

The action block 130 of FIG. 4 uses the equation below for duty cycle. (This equation assumes that the solenoid is a PWM solenoid.) It is expressed as follows:

$$DC\_CL = FNPRDCCL(PR\_CMDcl/PR\_EST\_LN) + FNPRDCDLCL(PR\_CMDcl/PR\_EST\_LN, TEMPERATURE)$$

Commanded clutch pressure then is converted to a corresponding duty cycle as follows:

Divide clutch pressure by estimated line pressure to get fractional pressure

Look up duty cycle vs. fractional pressure function for the clutch solenoid to find duty cycle Calculate temperature compensation for duty cycle by finding delta duty cycle from a lookup table based on oil temperature and fractional desired pressure.

If the solenoids are variable-force solenoids (VFS), the corresponding procedure would involve converting the commanded clutch pressure to commanded VFS pressure. The pressure then is clipped between a maximum limit and a calibratable minimum limit. VFS pressure is converted to VFS counts and compensated for temperature. The counts then are output to an electronic driver circuit in the control module. The driver circuit provides electrical current outputs, which drive the VFS solenoids for controlling clutch pressure.

After an engagement has ended, the time out value in the engagement start mode and the delta slip change are calculated.

The adaptive engagement feel control logic maintains consistency in the engagement quality by adapting the clutch pressure at the start of the inertia phase based on linearly extrapolated slip time change, as indicated at 144 in FIG. 5c, and by monitoring the time from the start of the shift to the start of the inertia phase. The adaptation of the pressure tables for storage in KAM will not occur if the transmission oil temperature is too low (that is, it is less than or approximately 70° F.), or if the throttle position is too high (that is, greater than approximately 5% wide-open throttle), or if the vehicle speed is too high, or the engine speed is too high (that is, it is greater than about 1500 rpm), or if the adaptive shift strategy is not enabled by an engagement.

When the adaptive engagement control logic is enabled, clutch pressure at the engagement start mode is calculated in accordance with the equation for PR_CMDoc, previously discussed. In that equation, the term PRDL_rom is a permanent storage term for pressure stored in ROM during the initial development and calibration of the transmission. The initial values for storage in KAM are changed when the transmission is in use. The terms PRDL_rom and PRDL_kam, taken together, comprise the initial stored value as modified by the learned value.

After the engagement has ended, the following parameter is calculated:

Time out in the engagement start mode, or nearly time out mode (in the near-time out window).

For purposes of calculating the time out value for the engagement start mode, any value in the so-called time out window, shown at 148 in FIG. 5c, can be used.

Figure 6:
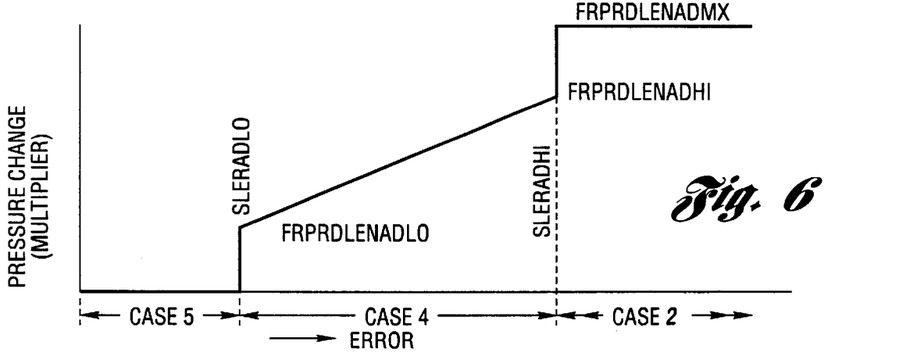
FIG. 6 is a plot of the adaptive delta pressure change criteria that determine whether the delta pressure change should be stored in KAM at the end of each control loop of the microprocessor.

The delta slip change or error indicated in FIG. 6 is a parameter that is calculated as follows:

Delta slip change rate = desired slip rate − base slip rate

Base slip rate = actual slip rate based on the calibratable portion of the slip change mode (SLTLENADEN−SLTLENADBG)−SL_BGN]*1000/TM_BS_SL Desired slip rate = function of engine speed {FNpnSLRDSRC (NE_FLT)} where

| | |
|---|---|
| SLTLENADBG | slip tolerance to begin the base slip rate calculation |
| SLTENADEN | slip tolerance to end the base slip rate calculation |
| SL_BGN | transmission slip recorded at minimum stroke time |
| TM_BS_SL | adaptive delta time for the base slip rate calculation |
| NE_FLT | filtered engine speed |

The change in the adaptive delta pressure table that is stored in KAM is determined in a way that is consistent with the following criteria. Each criterium is tested in sequence. If any one of them is true, tests for subsequent criteria are not needed. Base pressure = commanded clutch pressure at the start of slip change mode − clutch stroke pressure.

| | |
|---|---|
| CASE 1: | Maximum time in the engaged start mode exceeded; that is, time in engagement-start mode is greater than SpnTMMXSS. Delta Pressure = + Base pressure * FRPRDLENADMX (~0.15). |
| CASE 2: | \| Delta slip change rate \| > = SLERADHI. Delta pressure = +/− Base pressure * FRPRDLENADMX (~0.15). |
| CASE 3: | Time in the engagement start mode is within a "Time-Window" (between SpnFRTMSSAD * SpnTMMXSS and maximum allowed time in the mode (SpnTMMXSS)) Delta Pressure = [Base pressure * FRPRDLENADHI]/2. |
| CASE 4: | \| Delta Slip change rate \| > = SLERADLO. Delta pressure = +/− interpolated between Base pressure * FRPRDLENADHI and the same pressure * FRPRDLENADLO with respect to Delta slip change rate. |
| CASE 5: | Delta pressure = zero. | where

FRPRDLENADMX = fraction of adapted pressure used for maximum delta pressure change to KAM FRPRDLENADHI = fraction of adapted pressure used for high delta pressure change to keep alive memory FRPRDLENADLO = fraction of adapted pressure used for low delta pressure change to keep alive memory SpnFRTMSSAD = "window" time tolerance in engagement-start mode for using maximum adaptive pressure increase SLERADHI = high slip rate error threshold for determining adaptive delta pressure change SLERADLO = low slip rate error threshold for determining adaptive delta pressure change.

The relationship of these terms is illustrated in FIG. 6.

After the delta pressure is calculated, the pressure stored in KAM is updated in accordance with the following equation:

$$\text{Pr.in KAM}_{new} = \text{Pr.in KAM}_{old} + \Delta\text{pr}$$

The pressure in KAM, if it exceeds the calibrated percentage change from the clutch pressure based on input torque, is clipped to the calibrated value to ensure reliability.

Although a specific embodiment of the invention has been described, it will be obvious to persons skilled in the art that modifications may be made to the invention without departing from the scope of the invention. All such modifications and equivalents thereof are included within the scope of the following claims:

What is claimed is:

1. An electronic control system for controlling the engagement of a pressure-operated friction clutch of a multiple-ratio transmission in an automotive vehicle driveline with an output shaft and a throttle-controlled engine, the system comprising a microprocessor, the microprocessor being characterized by sequential execution of software instructions in a continuous control loop in response to driveline input control data;

a plurality of driveline sensors including an engine throttle position sensor, a transmission range selector position sensor, an output shaft speed sensor and an engine speed sensor, the microprocessor having an input signal conditioner with signal flow paths for receiving input and feedback signals from the sensors;

the microprocessor also having a calculation unit for computing transmission control parameters including transmission input torque, friction clutch slip and vehicle speed based on the input and feedback signals;

a base control unit of the microprocessor receiving computed vehicle speed, actual slip of the friction clutch and transmission input torque;

the calculation unit detecting changes in system control parameters and including means for developing a controlled friction clutch engagement pressure during vehicle startup as a function of the transmission control parameters;

means for recording the system control parameter changes during each control loop of the microprocessor, and an adaptive control unit for modifying the friction clutch engagement pressure calculated in a current control loop of the microprocessor in accordance with the recorded control parameters.

2. An electronic control system as set forth in claim 1 wherein the engine speed sensor and the output shaft speed sensor communicate with the calculation unit in a closed-loop fashion whereby the calculation unit determines in real time output signals indicating a vehicle speed signal, a clutch slip signal and commanded and actual friction clutch slip rate signals, output signals of the calculation unit being communicated to the base control unit.

3. An electronic control system for controlling the engagement of a friction clutch of a multiple-ratio transmission in an automotive vehicle driveline during vehicle startup, the driveline having an output shaft and a throttle-controlled engine, the transmission having a torque converter with an impeller connected drivably to the engine and a turbine drivably connected to the friction clutch;

the control system comprising a microprocessor including a calculation unit, a base control unit, memory storage registers and an adaptive control unit;

a plurality of driveline sensors including an engine throttle position sensor, a transmission range selector position sensor, an output shaft speed sensor, a turbine speed sensor, and an engine speed sensor;

the microprocessor having an input signal conditioner with signal flow paths for receiving input and feedbacks signals from the sensors including an engine speed signal, a turbine speed signal and an output shaft speed signal;

the microprocessor further having a calculation unit for computing transmission input torque, friction clutch slip and vehicle speed based on the input and feedback signals, the microprocessor being characterized by sequential execution of software instructions in a continuous control loop in response to driveline input control data;

the calculation unit detecting commanded slip rate of the friction clutch and comparing it to the actual slip rate to detect an error;

a base control unit of the microprocessor receiving computed vehicle speed, slip rate error, transmission input torque and friction clutch slip and computing a friction clutch control signal whereby the friction torque capacity of the clutch is controlled;

memory storage registers of the microprocessor including memory storage registers being in communication with the base control unit for storing clutch engagement parameters during each control loop of the microprocessor;

the microprocessor including further an adaptative control unit for modifying the friction clutch engagement signal developed by the control unit during a current control loop of the microprocessor by adjusting clutch pressure values in accordance with control parameters stored in the memory storage registers during a preceding control loop thereby compensating driving friction clutch engagement for a base control unit of the microprocessor, the base control unit receiving computed vehicle speed, slip rate error, transmission input torque and friction clutch slip and computing a friction clutch control signal whereby the friction torque capacity of the clutch is controlled;

the microprocessor adjusting clutch pressure values in accordance with control parameters stored in memory storage registers during the preceding control loop thereby compensating during friction clutch engagement for changes in system control parameters.

4. An electronic control system set forth in claim 3 wherein the engine speed sensor, the turbine speed sensor, and the output shaft speed sensor communicate with the calculation unit in a closed-loop fashion whereby the calculation unit determines in real time output signals indicating a vehicle speed signal, a clutch slip signal and commanded and actual friction clutch slip rate signals, output signals of the calculation unit being communicated to the base control unit.

5. A method for controlling engagement of a pressure-operated friction clutch of a multiple-ratio automatic transmission in a vehicle driveline having a throttle-controlled engine and an output shaft, the method comprising:

detecting driveline variables including throttle position, output shaft speed, engine speed, and transmission ratio;

calculating control parameters including friction clutch slip, transmission input torque, commanded clutch slip rate, actual clutch slip rate, slip rate error, and vehicle speed as a function of the driveline control variables;

determining desired clutch pressure as a function of current ratio, transmission input torque and vehicle speed;

executing a friction clutch engagement cycle by initiating an engagement start mode wherein clutch pressure is commanded to effect incipient clutch engagement;

initiating a torque transfer phase of the engagement cycle to control clutch pressure by increasing clutch pressure in the engagement start phase at a controlled rate; and initiating a slip change phase of the engagement cycle by controlling clutch pressure in a closed-loop fashion thereby decreasing clutch slip to a desired value over a predetermined time.

6. The method set forth in claim 5 wherein the slip change phase is followed during the engagement cycle by an engagement end phase whereby the commanded clutch pressure is increased nonlinearly until it reaches the commanded pressure thereby effecting full clutch engagement without an inertia torque disturbance during the engagement cycle.

7. An electronic control system for controlling the engagement of a friction clutch of a multiple-ratio transmission in an automotive vehicle driveline during vehicle startup, the driveline having an output shaft and a throttle-controlled engine, the transmission having a torque converter with an impeller connected drivably to the engine and a turbine drivably connected to the friction clutch;

the control system comprising a microprocessor including a calculation unit, a base control unit, memory storage registers and an adaptive control unit;

a plurality of driveline sensors including an engine throttle position sensor, a transmission range selector position sensor, an output shaft speed sensor, a turbine speed sensor, and an engine speed sensor;

the microprocessor having an input signal conditioner with signal flow paths for receiving input and feedbacks signals from the sensors including an engine speed signal, a turbine speed signal and an output shaft speed signal;

the microprocessor further having a calculation unit for computing transmission input torque, friction clutch slip and vehicle speed based on the input and feedback signals, the microprocessor being characterized by sequential execution of software instructions in a continuous control loop in response to driveline input control data;

the calculation unit detecting commanded slip rate of the friction clutch and comparing it to the actual slip rate to detect an error; and a base control unit of the microprocessor receiving computed vehicle speed, slip rate error, transmission input torque and friction clutch slip and computing a friction clutch control signal whereby the friction torque capacity of the clutch is controlled;

memory storage registers of the microprocessor being in communication with the base control unit for storing clutch engagement parameters during each control loop of the microprocessor;

the microprocessor including further an adaptative control unit for modifying the friction clutch engagement signal developed by the control unit during a current control loop of the microprocessor by adjusting clutch pressure values in accordance with control parameters stored in the memory storage registers during a preceding control loop thereby compensating driving friction clutch engagement;

the microprocessor adjusting clutch pressure values in accordance with control parameters stored in memory storage registers during the preceding control loop thereby compensating during friction clutch engagement for changes in system control parameters;

the transmission input torque calculated by the calculation unit being a feed-forward torque value, the calculation unit including a stored functional relationship between engine throttle position and engine torque and a torque multiplier value, the stored functional relationship being modified by the multiplier value to effect a torque product providing an early indication of friction clutch pressure requirements.

8. An electronic control system for controlling the engagement of a friction clutch of a multiple-ratio transmission in an automotive vehicle driveline during vehicle startup, the driveline having an output shaft and a throttle-controlled engine, the transmission having a torque converter with an impeller connected drivably to the engine and a turbine drivably connected to the friction clutch;

the control system comprising a microprocessor including a calculation unit, a base control unit, memory storage registers and an adaptive control unit;

a plurality of driveline sensors including an engine throttle position sensor, a transmission range selector position sensor, an output shaft speed sensor, a turbine speed sensor, and an engine speed sensor;

the microprocessor having an input signal conditioner with signal flow paths for receiving input and feedbacks signals from the sensors including an engine speed signal, a turbine speed signal and an output shaft speed signal;

the microprocessor further having a calculation unit for computing transmission input torque, friction clutch slip and vehicle speed based on the input and feedback signals, the microprocessor being characterized by sequential execution of software instructions in a continuous control loop in response to driveline input control data;

the calculation unit detecting commanded slip rate of the friction clutch and comparing it to the actual slip rate to detect an error; and a base control unit of the microprocessor receiving computed vehicle speed, slip rate error, transmission input torque and friction clutch slip and computing a friction clutch control signal whereby the friction torque capacity of the clutch is controlled;

memory storage registers of the microprocessor being in communication with the base control unit for storing clutch engagement parameters during each control loop of the microprocessor;

the microprocessor including further an adaptative control unit for modifying the friction clutch engagement signal developed by the control unit during a current control loop of the microprocessor by adjusting clutch pressure values in accordance with control parameters stored in the memory storage registers during a preceding control loop thereby compensating driving friction clutch engagement;

the engine speed sensor, the turbine speed sensor and the output shaft speed sensor communicating with the calculation unit in a closed-loop fashion whereby the calculation unit determines in real time output signals indicating a vehicle speed signal, a clutch slip signal and commanded and actual friction clutch slip rate signals, output signals of the calculation unit being communicated to the base control unit;

the transmission input torque calculated by the calculation unit being a feed-forward torque value, the calculation unit including a stored functional relationship between engine throttle position and engine torque and a torque multiplier value, the stored functional relationship being modified by the multiplier value to effect a torque product providing an early indication of friction clutch pressure requirements.

9. A method for controlling engagement of a pressure-operated friction clutch of a multiple-ratio automatic transmission in a vehicle driveline having a throttle-controlled engine and an output shaft, the method comprising:

detecting driveline variables including throttle position, output shaft speed, engine speed, and transmission ratio;

calculating control parameters including friction clutch slip, transmission input torque, commanded clutch slip rate, actual clutch slip rate, slip rate error, and vehicle speed as a function of the driveline control variables;

determining desired clutch pressure as a function of current ratio, transmission input torque and vehicle speed;

executing a friction clutch engagement cycle by initiating an engagement start mode wherein clutch pressure is commanded to effect incipient clutch engagement;

initiating a torque transfer phase of the engagement cycle to control clutch pressure by increasing clutch pressure in the engagement start phase at a controlled rate; and initiating a slip change phase of the engagement cycle by controlling clutch pressure in a closed-loop fashion thereby decreasing clutch slip to a desired value over a predetermined time;

the step of increasing clutch pressure at a controlled rate being achieved by increasing commanded clutch pressure as follows:

$$PR\_CMDoc = \{PR\_CMDoc\_old + PRSLTT + \Delta TQ\_trans * MLTQoc/GAINoc\} * MLTEoc$$

where

PRSLTT = slope of the pressure increase $\Delta TQ\_trans$ = change in transmission input torque from previous loop and where $$PR\_CMDoc = PR\_CMDoc - [\{TQ\_TRANS + TQ\_i\alpha,\} * MLTQoc/GAINoc + PRSToc - Cfoc*(NT/1000)^2 + FNpnPRTTOF(TP) - PRDL\_rom + PRDL\_kam] * MLTEoc$$

where

| | |
|---|---|
| PR_CMDoc | = Oncoming clutch commanded pressure |
| TQ_TRANS | = Input torque to transmission (computed as a torque-feed-forward by the engine controller, not shown) |
| Cfoc | = Conversion constant for centrifugal force compensation |
| TQ_iα | = Inertial torque based on inertia, change in turbine speed, and desired ratio change time { = CONST * Inertia * ΔNT/ratio change time} |
| MLTQoc | = Ratio of clutch torque to input torque |
| MLTEoc | = Temperature compensation multiplier |
| GAINoc | = Clutch gain |
| PRSToc | = Oncoming clutch stroke pressure |
| NT | = Turbine speed |
| PRDL_rom | = Delta clutch pressure from ROM table |
| PRDL_kam | = Delta clutch pressure from KAM table |
| FNpnPRTTOF(TP) | = Increment in commanded pressure for faster response. |

10. A method for controlling engagement of a pressure-operated friction clutch of a multiple-ratio automatic transmission in a vehicle driveline having a throttle-controlled engine and an output shaft, the method comprising:

detecting driveline variables including throttle position, output shaft speed, engine speed, and transmission ratio;

calculating control parameters including friction clutch slip, transmission input torque, commanded clutch slip rate, actual clutch slip rate, slip rate error, and vehicle speed as a function of the driveline control variables;

determining desired clutch pressure as a function of current ratio, transmission input torque and vehicle speed;

executing a friction clutch engagement cycle by initiating an engagement start mode wherein clutch pressure is commanded to effect incipient clutch engagement;

initiating a torque transfer phase of the engagement cycle to control clutch pressure by increasing clutch pressure in the engagement start phase at a controlled rate; and initiating a slip change phase of the engagement cycle by controlling clutch pressure in a closed-loop fashion thereby decreasing clutch slip to a desired value over a predetermined time;

the slip change phase being followed during the engagement cycle by an engagement end phase whereby the commanded clutch pressure is increased nonlinearly until it reaches the commanded pressure thereby effecting full clutch engagement without an inertia torque disturbance during the engagement cycle; and the closed-loop clutch control in the slip change phase of the engagement cycle being achieved by increasing commanded pressure for the clutch as follows:

$$PR\_CMDoc = [PR\_CMDoc\_old + \Delta P(PID)*FNFRRB(ctr\_ramp) + FNPRCO(\Delta TP) + CCPRTF*(\Delta TQ\_TRANS)] * FNMLTEoc(tempr.)$$

where:

FNFRRB(ctr_ramp) is a multiplier as a function of loop count from the start of ratio change to reduce the gain of PID controller for the first few loops, for smooth transition;

FNPRCO($\Delta TP$) is a feed-forward term to compensate for sudden large changes in throttle position (ahead of torque changes);

CCPRTF is a constant torque feed-forward term to compensate for changes in input torque; and FNMLTEoc(tempr.) is a temperature compensation multiplier; and where:

$$\Delta P(PID) = Kc*[Kp*(SLR\_ERR\_TO - SLR\_ERR\_T1) + Ki*SLR\_ERR\_TO + Kd*(SLR\_ERR\_TO - 2*SLR\_ERR\_T1 + SLR\_ERR\_T2)],$$

where:

SLR_ERR is computed as the difference between commanded and actual slip rates;

SLR_ERR_TO, SLR_ERR_T1, SLR_ERR_T2 are control errors at current loop, previous loop, and one loop before previous loop, respectively; Kc is the overall gain, Kp is the proportional gain, Ki is the integral gain, and Kd is the derivative gain.

* * * * *